United States Patent

He et al.

[11] Patent Number: 6,088,482
[45] Date of Patent: Jul. 11, 2000

[54] TECHNIQUES FOR READING TWO DIMENSIONAL CODE, INCLUDING MAXICODE

[75] Inventors: Duanfeng He, Farmingville, N.Y.; Kevin Hunter, Fort Myers, Fla.; Eugene Joseph, Coram, N.Y.

[73] Assignee: Symbol Technologies, Inc., Holtsville, N.Y.

[21] Appl. No.: 09/176,894

[22] Filed: Oct. 22, 1998

[51] Int. Cl.[7] .................................................. G06K 9/46
[52] U.S. Cl. ............................................ 382/202; 235/494
[58] Field of Search .............................. 382/202; 235/494

[56] References Cited

U.S. PATENT DOCUMENTS

| | | |
|---|---|---|
| 5,637,849 | 6/1997 | Wang et al. .............................. 382/202 |
| 5,966,463 | 10/1999 | Wang ....................................... 382/202 |

OTHER PUBLICATIONS

A Two–Dimensional Bar Code Reader, N. Normand et al., IEEE 1051–4651/94, pp. 201–203 (1994).
IR–2000 Features & Specifications, Metanetics Corporation, MET02–002 Dec. 1996.
IMAGETEAM® 4400 Series, Welch Allyn, ISL 391 Rev. E, Jun. 1997.

*Primary Examiner*—Harold I. Pitts
*Attorney, Agent, or Firm*—Burns, Doane, Swecker & Mathis LLP

[57] ABSTRACT

The disclosure relates to techniques for determining the presence, orientation and location of features in an image of a two dimensional optical code. The techniques are adapted for use in mapping data in an image pixel plane with grid locations in a grid-based two dimensional code to account for size, rotation, tilt, warping and distortion of the code symbol. Where such a code is a MaxiCode, techniques are disclosed for determining the presence and location of the MaxiCode bulls-eye, orientation modules, primary data modules and secondary data modules.

19 Claims, 7 Drawing Sheets

SEED POINTS

GENERATED GRID POINTS

TECHNIQUES FOR READING TWO DIMENSIONAL CODE, INCLUDING MAXICODE

FIELD OF THE INVENTION

The invention relates to techniques for reading two dimensional code such as MaxiCode. Aspects of the invention are particularly useful in imaging optical code readers which are designed to read various kinds of optical code.

BACKGROUND OF THE INVENTION AND OBJECTS

Optical codes are patterns made up of image areas having different light reflective or light emissive properties, which are typically assembled in accordance with a priori rules. The term "bar code" is sometimes used to describe certain kinds of optical codes. The optical properties and patterns of optical codes are selected to distinguish them in appearance from the background environments in which they are used. Devices for identifying or extracting data from optical codes are sometimes referred to as "optical code readers" of which bar code scanners are one type. Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target bar code from a printed listing of many bar codes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional bar code symbols. The bar code is a pattern of variable-width rectangular bars separated by fixed or variable width spaces. The bars and spaces have different light reflecting characteristics. One example of a one dimensional bar code is the UPC/EAN code used to identify, for example, product inventory. An example of a two dimensional or stacked bar code is the PDF417 bar code. A description of PDF417 bar code and techniques for decoding it are disclosed in U.S. Pat. No. 5,635,697 to Shellhammer et al. and assigned to Symbol Technologies, Inc., which patent is incorporated herein by reference.

Conventional codes are known which are based on a two dimensional grid whose geometry is independent of data content. The grid may be a plane tiled by regular polygons such as squares or hexagons. Typically a black or white feature or polygon is located at each grid location.

Figure 4:
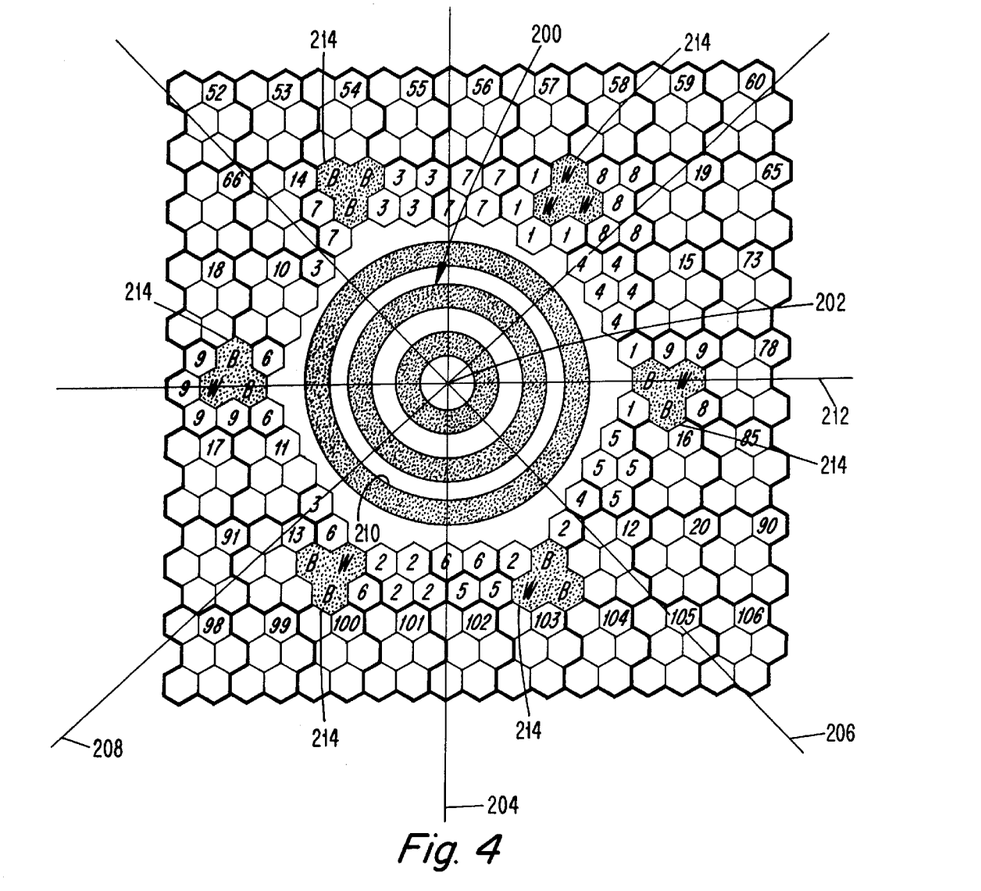
FIG. 4 is a plan view of a portion of the arrangement of a conventional MaxiCode symbol, with the addition of reference axes.

One such two dimensional optical code known in the art is MaxiCode. A portion of a conventional MaxiCode symbol is shown in FIG. 4. MaxiCode is a matrix symbology made up of offset rows of hexagonal modules arranged around a finder pattern. A MaxiCode symbol may consist of a unique central finder pattern: up to 3 dark concentric rings and 3 included light areas, sometimes called a "bulls-eye". The central finder pattern is surrounded by an approximately square-shaped array of 33 offset rows of hexagonal modules. The 33 rows in the symbol alternate between 30 and 29 modules in width. Orientation information (rotation) is provided by 6 patterns of three modules each located adjacent to the bulls-eye. Data is carried in the presence or absence of darkened modules within the hexagonal grid. A binary encoding scheme may be used to represent information in black (low reflectivity) and white (high reflectivity). MaxiCode is described in detail in the publication "International Symbology Specification - MaxiCode", by AIM International, Inc. (hereinafter "AIM Specification").

Various optical codes including MaxiCode can be read employing imaging devices. For example an image sensor may be employed which has a two dimensional array of cells or photo sensors which correspond to image elements or pixels in a field of view of the device. Such an image sensor may be a two dimensional or area charge coupled device (CCD) and associated circuits for producing electronic signals corresponding to a two dimensional array of pixel information for a field of view. An imaging engine usable in reading MaxiCode is disclosed in U.S. patent application Ser. No. 09/096,578 filed Jun. 12, 1998, entitled IMAGING ENGINE AND METHOD FOR CODE READERS to Correa et al. which is hereby incorporated by reference. Electronic circuits in or associated with the imaging engine may be provided to decode MaxiCode.

The above-mentioned AIM Specification discloses a frequency—domain technique to decode MaxiCode. In such processes three principal MaxiCode axes, assumed to correspond to the hexagon grid, are found in two dimensional pixel data using a Fourier transform technique. Grid locations for the modules are then determined by use of inverse Fourier transform techniques. However, such techniques require computationally intensive, two dimensional transforms, which have long processing times particularly at high resolution levels preferred for accurate decoding. Moreover, such techniques may not accurately accommodate tilted or warped MaxiCode symbols.

Accordingly, it is an object of the present invention to provide a fast and efficient technique for decoding grid-based two dimensional code such as MaxiCode.

It is another object of the present invention to provide a technique for decoding grid based, two dimensional code which better tolerates tilt and/or warping of the code symbol as seen by the image sensor.

It is another object of the present invention to provide a technique for decoding MaxiCode which produces an accurate grid mapping which can better accommodate symbol grid distortion and which can take into account tilt in the plane of the MaxiCode symbol with respect to the optical axis of the image sensor.

In U.S. Pat. No. 5,637,849 to Wang et al., it has been proposed to extract data from a MaxiCode symbol using a spatial domain technique, without frequency domain transforms. The technique includes identifying two intersecting diameters of at least one traversal line having an alignment normal to the sides of the hexagonal data cells. In the case that the symbol is on a non-planar surface, Wang et al. teaches that the top row of data cells must be sampled by an angled row of pixels and, the middle row of data samples by a horizontal row of pixels and intermediate rows of data cells sampled at angles interpolated between the top angle and horizontal. Alternatively, or in addition, a normalization routine may be implemented for individual rows of data cells.

MaxiCode is a type of matrix code which lacks extensive self-synchronization such as that built into PDF417. Some variants of Data Matrix also fall into this category. To decode such types of two dimensional bar codes, a projection or interpolation based on a single line or even a few lines is not adequate and could result in module displacement.

Accordingly, it is an object of the present invention to provide more accurate techniques for mapping a code grid, particularly one which lacks extensive self-synchronization such as MaxiCode.

It is another object of the present invention to provide techniques for more accurately and efficiently decoding grid-based two dimensional codes in situations where the code symbol does not lie in a plane normal to the optical axis of the image sensor.

It is another object of the present invention to provide techniques for decoding grid-based two dimensional codes in situations where the code symbol or the image of the code symbol is progressively distorted from the nominal grid pattern on which the code is based.

These and other objects and features of the invention will be apparent from this written description and drawings.

SUMMARY OF THE INVENTION

The disclosure relates to techniques for determining the presence, orientation and location of features in an image of a two dimensional optical code especially grid-based codes whose geometry is independent of data content, and more especially grid-based code based on repeating non-rectangular module shapes such as hexagons. The techniques are adapted for use in locating finder patterns and orientation modules, and in mapping data in an image pixel plane with grid locations in a grid-based two dimensional code to account for size, rotation, tilt, warping and distortion of the code symbol. Where such a code is a MaxiCode, techniques are disclosed for determining the presence and location of the MaxiCode bulls-eye and orientation modules.

More particularly, a preferred embodiment of the present invention is a method for determining the presence and location of a MaxiCode symbol bulls-eye and the orientation of the symbol in pixel data obtained by an optical code reader. In this method a candidate center in a run of pixels having a color indicative of the center area of the bulls-eye is identified. The candidate center is tested to determine if adjacent pixel runs have a predetermined amount of mirror symmetry with respect to the candidate center. Plural points are located on axes radiating from the identified run and intersecting an edge of a ring of the MaxiCode bulls-eye. An ellipse is fitted to the located points and the ellipse is expanded outwardly to estimate the location of orientation modules of the MaxiCode. The orientation of the MaxiCode symbol is determined from information read from the orientation modules.

The fitted ellipse may be required to have major and minor dimensions having a ratio of 2:1 or less. If this ratio is not met, the image may be rejected as exhibiting too great a tilt. A least squares fit may be employed to find the major and minor dimensions of the ellipse fitted to the located points. In preferred embodiments the ring edge located and fitted is the inner edge of the outermost black ring of the MaxiCode bulls-eye. Up to 24 points may be used in the least square fit to find the major and minor dimensions of the ellipse.

Another preferred embodiment of the present invention includes techniques for associating pixel data in a pixel plane of a two dimensional grid-based symbol with corresponding modules in the grid. In accordance with this technique, subsets of the pixel data having a known association with plural seed modules such as MaxiCode orientation modules, are identified. The coefficients of an Euler transform are determined through a least-squared best-fit method using the identified association between the pixel data subsets and the seed modules. Using the Euler transform, other locations in the pixel plane are associated with additional symbol modules.

In preferred embodiments of this technique, more than six seed modules are employed. In the case that the symbol is a MaxiCode symbol, the seed modules may be a selected subset of the 18 orientation hexagon modules of the MaxiCode symbol, preferably as many of such modules whose locations are readily distinguishable. The technique is usable, for example, where the grid-based symbol is not located in any single plane perpendicular to the optical axis of the optical code reader, such as where the symbol lies on a tilted plane or is printed on the curved face of a can.

In another preferred embodiment of the present invention a method is employed for decoding a MaxiCode symbol to obtain data from the primary data modules and secondary data modules located on the hexagonal grid. In such a method the central finder pattern is located and then the orientation modules located based on the location of the central finder pattern. The location of primary data modules of the MaxiCode are found based on the previously determined locations of the orientation modules. The secondary data modules are sequentially locating outwardly from the primary message modules toward the edge of the symbol using previously located positions of adjacent modules. Secondary data modules are located in a successive radial progression of rings of hexagons outward toward the edges of the symbol.

In preferred embodiments the location of secondary data modules are estimated using the positions of adjacent modules and just past adjacent modules. The location of a first set of secondary data modules may be refined by centering black/white transitions before locating a next set of secondary data modules further outward for the central finder pattern. Deviations from a regular hexagonal grid are accumulated as the location of secondary data modules proceeds outwardly from the central finder pattern.

The initial location of the central finder pattern may be based on finding a candidate bulls-eye center by testing local symmetry about selected axes. A candidate sequence of alternating runs running in a horizontal direction (with respect to the image detector) may be tested, the $5^{th}$ run being the candidate center run.

Initially, the candidate sequence is evaluated to verify that the lengths of the runs are within a predetermined proportion of a selected one of the runs.

In preferred embodiments, a candidate center may be further tested by evaluating pixel data vertically above and below the candidate center for approximate mirror symmetry in the location of corresponding black/white transitions in the data. In one embodiment, horizontal and vertical distances may be subjected to a ratio test to evaluate the image. Yet further testing of a candidate center may be done by evaluating pixel data on diagonal lines passing through the candidate center for appropriate mirror symmetry in the location of corresponding black/white transitions in the data. If all tests are passed, the candidate center and/or black/white transition data may be used to locate additional features of the MaxiCode.

The scope of the present invention is defined in the claims.

DETAILED DESCRIPTION OF THE PREFERRED EMBODIMENTS

Figure 1:
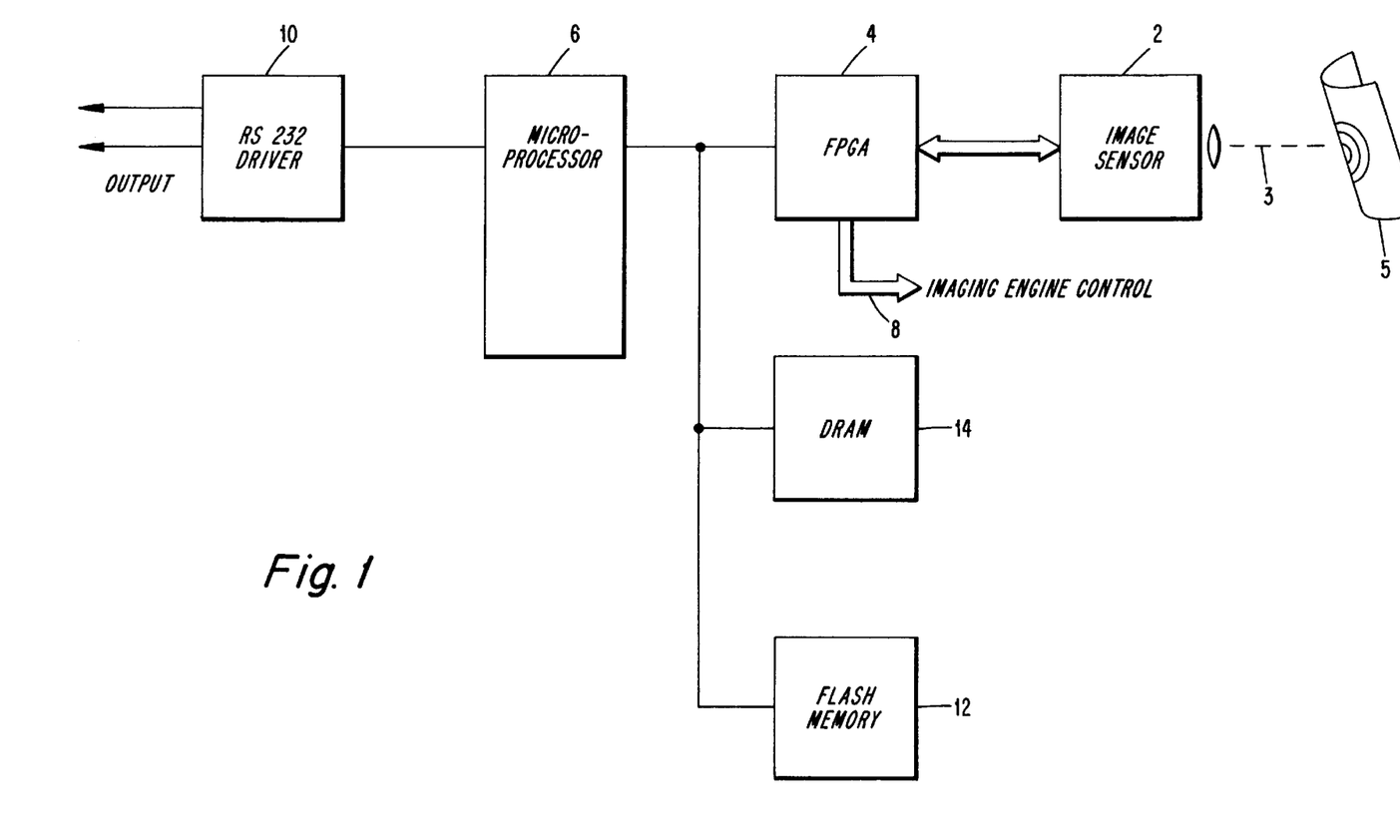
FIG. 1 is a block diagram of various electronic circuits employed in a preferred embodiment of the present invention.

FIG. 1 is a block diagram of various electronic circuits employed in preferred embodiments of the present invention. An image sensor 2 has an optical axis 3. An image is obtained of a symbol, shown located on an arbitrary warped and tilted surface 5 (not in a plane and not perpendicular to the optical axis 3).

As shown in FIG. 1, electronic signals from the image sensor 2 pass to FPGA (or ASIC) circuit 4. In a preferred embodiment, the image sensor 2 includes a CCD detector and various signal conditioning circuits which produce a digital output signal. This digital output signal may be in the form of electronic signals corresponding to a two dimensional array of pixel information for a target field of view. Digital signals from the imaging sensor are supplied to the microprocessor 6 by the FPGA circuit 4. As indicated by the data line 8, the FPGA also provides control signals from the microprocessor for control of, for example, the aiming systems, illumination systems and objective lens servo systems of the imaging engine. The microprocessor also provides information to external systems via the RS 232 driver 10. This may include data decoded in accordance with the techniques described below.

The micro-processor may also communicate by data line to Flash memory 12 and DRAM 14 on which software and data for the system are stored, respectively. This stored information may include data from a target optical code.

Figure 2:
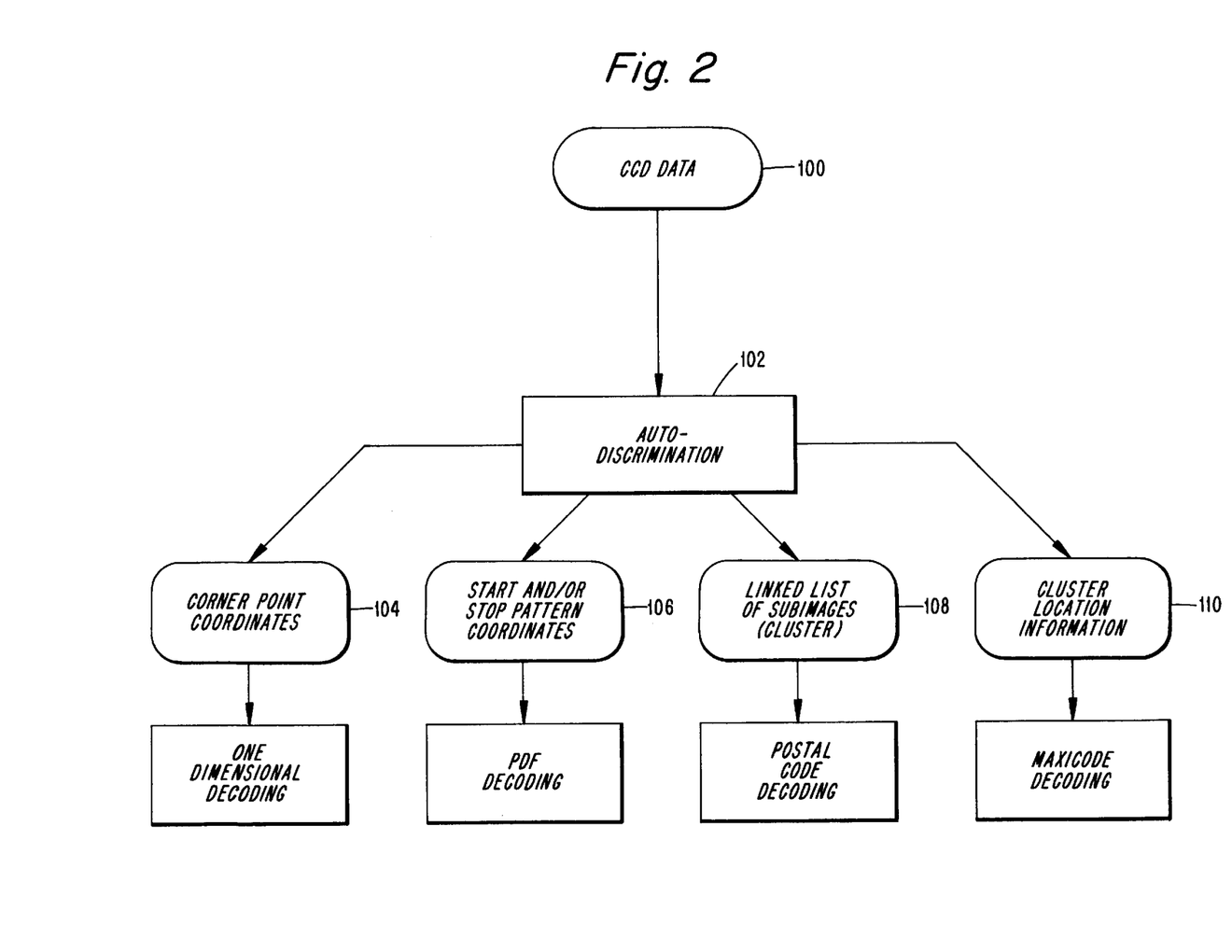
FIG. 2 is a combined flow chart and system block diagram illustrating the preprocessing and decoding of CCD data in a preferred embodiment of the present invention.

FIG. 2 is a combined flow chart and system block diagram illustrating autodiscrimination of image sensor data. Data obtained by the image sensor circuitry is indicated at 100. This data may be in the form of electronic signals corresponding to a two dimensional array of pixel information for a target image. The data may be stored for subsequent processing in the DRAM of the optical code reader. It will be understood that the processing software which implements the processes of the present disclosure may have access to the stored image data at all levels. At various processing steps, portions of the pixel data may be called up for further processing or to confirm on-going analyses.

The pixel data may be divided into subimages, for example, 32×32 pixel subimages. These subimages are analyzed for properties known to be associated with various types of optical codes and known to distinguish a particular code from other codes and environmental (non-code) images. More particularly, a process of statistical Autodiscrimination may be employed. In statistical Autodiscrimination the image is divided into sub-images or sections and some statistic computed for each section. Subimages with similar statistics can be grouped to form regions of interest or clusters which may contain codes. The advantage of the statistical approach is that once the statistics are compiled, only the sub-images need to be processed, significantly reducing the computation requirements. In addition, the compilation of the statistics is simple and can be done in hardware for super fast systems. The statistic used in preferred embodiments is a histogram of local surface orientations. The statistics can be obtained by analyzing surface tangents to cluster the subimages. Once a cluster is identified, the image data may be further analyzed to detect the presence of tangents associated with particular types of optical codes. Statistical Autodiscrimination is a subject of a U.S. patent application Ser. No. 09/096,348 entitled *AUTODISCRIMINATION AND LINE DRAWING TECHNIQUES FOR CODE READERS* and assigned to Symbol Technologies, Inc., which application is hereby incorporated by reference. Alternatively, a neural network can be used to discriminate image areas of possible interest as containing optical code. A neural network can also be designed to look directly at the input image. The location of the aiming pattern with respect to the subimages may also be used as an indicia or weighting factor in selecting subimages for further processing.

In preferred embodiments, Autodiscrimination software executed by the system microprocessor determines which subimage clusters contain codes of a particular type and the coordinates in the pixel data array of certain boundaries or features of preliminarily identified code areas. This system is indicated at 102. As shown in FIG. 2, the image data may be preliminarily identified as a one dimensional code, two dimensional code (PDF), Postal Code or MaxiCode, it being understood that other code types with recognizable statistical or contrast patterns could be identified at this stage of processing. This preliminary identification is used to select the appropriate decoding techniques. The autodiscrimination function also passes information about the image useful in decoding. This information is shown in data windows 104 through 110 in FIG. 2. Data window 110 corresponds to MaxiCode data used in decoding: location information concerning one or more clusters of subimages preliminarily identified by the Autodiscrimination function as containing MaxiCode.

Figure 3:
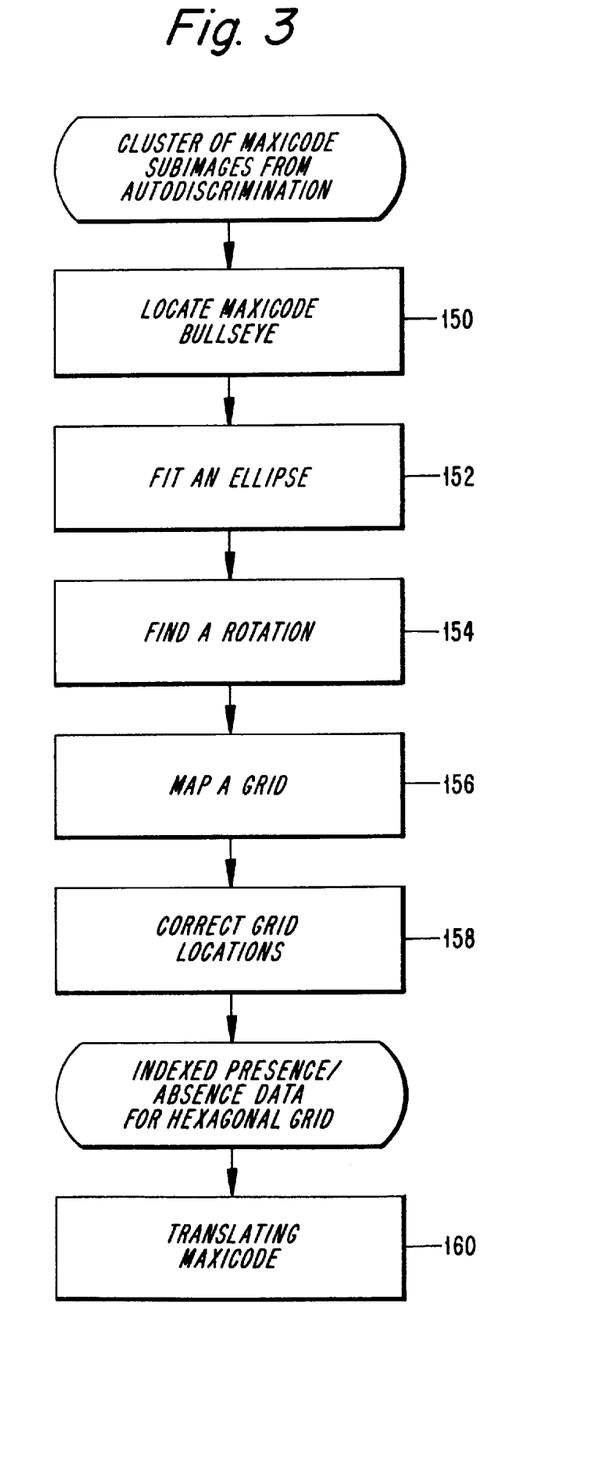
FIG. 3 is a flow chart illustrating the reading and translating of two dimensional, image data identified by preprocessing as corresponding to a MaxiCode symbol.

FIG. 3 is a flow chart illustrating the processing and decoding of two dimensional pixel data identified by the Autodiscrimination function 102. This identification is based on the fact that the Autodiscrimination function has found within an image cluster a contrast variation within predetermined limits, but no threshold groupings of surface tangents which would be indicative of other codes having generally orthogonal feature edges such as one dimensional code, postal code or PDF code. In the processing of FIG. 3, cluster data may be accepted line by line.

In basic overview, the technique attempts to locate a MaxiCode bulls-eye at 150 by analyzing the pixel data for patterns indicative of concentric rings. An ellipse may then be fitted to the inside edge of the outermost black ring at 152. The rotation of the grid is determined from the location of the 18 orientation hexagons in the image as indicated at 154. A transformation is calculated to account for scale and tilt of the target code and to map a grid, at processing step 156. Grid locations are adapted progressively outwardly by shifting hexagon centers to better fit the pixel data, as indicated at block 158. The result of this processing is indexed presence/absence data for the hexagonal MaxiCode grid. This data is passed to the MaxiCode translating function at 160. If the MaxiCode decoding or translating fails during the processing of FIG. 3, process control may be returned to the Autodiscrimination function 102 to select another code type and/or cluster of subimage pixels for analysis.

Preferred embodiments of the decoding technique will now be described in greater detail, with particular reference to FIG. 4 which illustrates the arrangement of features in a portion of the MaxiCode symbol.

For purposes of this patent application, a code "symbol" refers to an optical code printed or otherwise presented to view and having variable light reflectivity capable of being detected by a code reader. A "MaxiCode symbol" refers to a symbol having a central finder pattern and data carried in the presence or absence of darker modules arranged in a hexagonal grid surrounding the finder pattern. Examples of such MaxiCode symbols are described in the AIM Specification.

In MaxiCode decoding, typically the central finder pattern (bulls-eye) 200 is first located. In a preferred embodiment of the present invention this process proceeds as follows. A linked list of subimages or cluster is identified by the Autodiscrimination function. Within this identified area, each horizontal line is converted into run lengths. A moving window averaging technique is used to generate an estimated grey scale threshold to determine the color of the center pixel in the window. Alternatively, the threshold may be generated in the previously preformed subimage processing.

Each higher reflectance (white) run is tentatively treated as if it were in the white center circle 202 of a bulls-eye. A run is a string of two or more adjacent pixels each indicating a reflectance from the symbol either above or below a threshold value. For example, runs of from 2 to 30 white pixels may be treated as candidate center runs. Four adjacent runs of alternating color are examined on either side of the candidate center. According to the context, the word "color" is used to indicate the grey scale value of one or more pixels or a determination that a run or area of the image is black or white. The widths of corresponding pairs of runs are compared to determine whether they are too big or too small in relation to one another. The thresholds for rejection are tunable parameters based on the optical characteristic of the system. Processing is expedited by noting a bad run size as it is collected and preventing further analysis as long as this run is in the current window.

Figure 5:
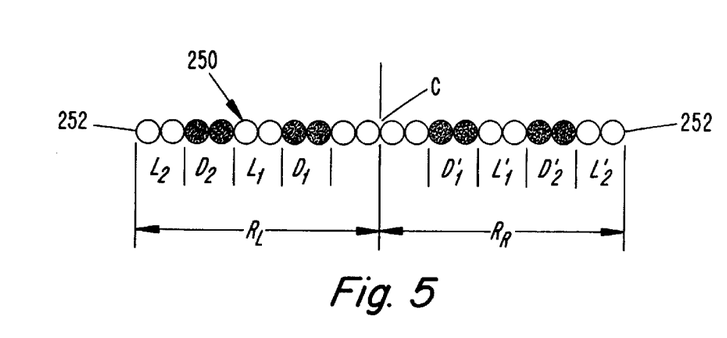
FIG. 5 is an example of pixel runs used in a preferred embodiment of the present invention.

This operation is illustrated with a simple example in FIG. 5. In FIG. 5 the line of black and white dots 250 corresponds to a window of pixels from a horizontal row of pixels in an image cluster identified by the Autodiscrimination function as possibly containing the image of a MaxiCode symbol. The four central pixels have been identified as a candidate center run. Four adjacent runs on the left side $L_1$, $L_2$, $D_1$, $D_2$ and on right side $L'_1$, $L'_2$, $D'_1$, $D'_2$ corresponding to black and white pixels (differentiated Light and Dark grey scale values) have been determined to have lengths falling within tunable parameters of the system. In this case each of corresponding runs on the left and right side of the candidate center have equal widths, i.e. they are exactly mirror symmetric about the candidate center C.

Next, for each of the 4 adjacent runs on either side, a cumulative radius from the candidate center of the bulls-eye is calculated. The left and right cumulative radii must be approximately symmetric. If the mismatch of the radii exceeds a predetermined threshold (e.g. a ratio of 2:1), the candidate center is rejected.

This operation is illustrated in the example of FIG. 5. From the pixel data of FIG. 5 the system compares the left radius $R_L$ and right radius $R_R$ (the distances in the pixel plane from the candidate center C to the posited inner edge 252 of the third black ring). In the example these distances are equal, therefore, the candidate center would not be rejected at this stage of processing, but would be further examined.

If the candidate center passes the previous test, a set of vertical run lengths is generated using the same technique. This process works from the center out, however, and stops when five black/white or white/black transitions have been seen above and below the candidate center. This set of runs is subjected to the same symmetry and min/max run size tests listed above. If the vertical run passes, a further test is made—the ratio of the horizontal to vertical sizes must be between 1:2 and 2:1. Ratios outside this would indicate a symbol tilt exceeding 60 degrees, and, thus, would not represent a good candidate image for decoding. If both the horizontal and vertical tests are passed, a pair of diagonal runs are also tested. Each diagonal run must individually pass the run length min/max test and the symmetry test and the pair must meet the 1:2–2:1 test.

Another preferred procedure for locating a central finder pattern of a MaxiCode will now be described. The initial location of the central finder pattern may be based on finding a candidate center using the following steps:

(a) locating a horizontal sequence of 9 alternating black and white runs of pixels such as shown in FIG. 5, wherein
  (i) the first run is white,
  (ii) each run is between half and twice the length of the first run, and
  (iii) each run is between 1 and 30 pixels in length.
(b) choosing the center of the middle (i.e. $5^{th}$) run as a candidate center;
(c) examining a vertical sequence of pixels running on a vertical axis passing through the candidate center found in step (b) and evaluating whether the four adjacent runs above the candidate center run and the four adjacent runs located below the candidate center run are between half and twice the length of the run of the candidate center;
(d) determining whether the ratio of the length of the vertical sequence is between half and twice the length of the horizontal sequence; if so
(e) using the center points of the horizontal and vertical sequences to redetermine (i.e. recenter) the candidate center, thereby locating a new candidate center;
(f) examining a new horizontal sequence of pixels running through the new candidate center and evaluating the run lengths as in step (c) to determine whether they have the required proportionality;
(g) examining pixels sequences lying on two different diagonal scan lines passing through the new horizontal sequence of pixels, and evaluating the runs lengths as in step (c) to determine whether they have the required proportionality;
(h) determining whether the ratio of the length of one diagonal sequence is between half and twice the length of the other diagonal sequence. If so, the systems proceeds on the basis that the candidate center is the center of the central finder pattern.

It will be observed the foregoing that similar evaluation schemes may be used to locate finder patterns other than concentric round bulls-eye patterns, such as nested squares. This is so because the pattern detection scheme is based on mirror symmetries with respect to one or more selected axes.

Figure 6:
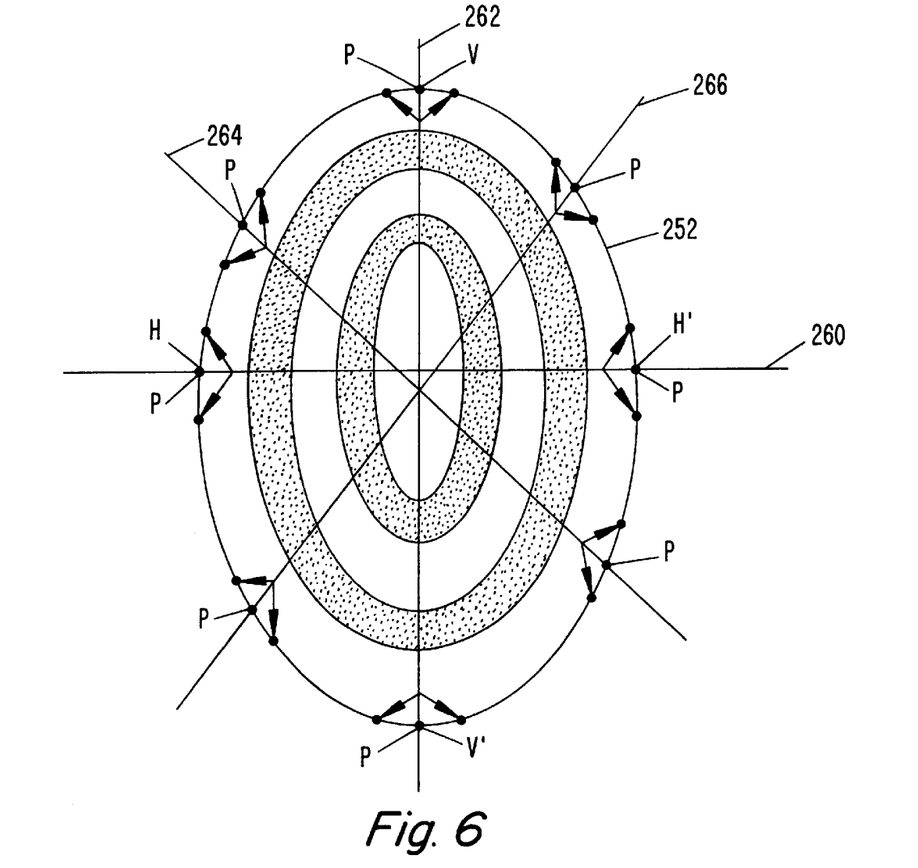
FIG. 6 is a detail of an image of a central finder or bulls-eye of a MaxiCode symbol showing the location of ellipse fitting points in accordance with a preferred embodiment of the present invention.

FIG. 6 illustrates some of the geometry of these tests. The Figure shows the projection in the image plane of a portion of a MaxiCode bulls-eye lying in a plane tilted with respect to the optical axis of the image sensor. Horizontal and vertical axes passing near or through the candidate center run are identified by numerals 260 and 262, respectively. The line $\overline{HH^1}$ lies on a horizontal run and the line $\overline{VV^1}$ lies on a vertical run. The length of the lines may be compared to determine whether they exceed a 2:1 ratio. Axes 264 and 266 lie on diagonal runs which may also be tested as discussed above.

Once a candidate center is found that passes the above tests, an ellipse is fitted to the inside edge 252 of the outer black ring. (The outside edge of this ring may be corrupted by adjacent black hexagonal modules, so this is the largest reliable ring). The points p at which the horizontal, vertical and diagonal lines (axes 260–266 of FIG. 6) intersect the black ring are computed to sub-pixel accuracy using the calculated threshold. This gives eight points on the ring. An additional 16 points are generated by backing off from this intersection point and moving diagonally (for horizontal or vertical runs) or horizontally/vertically (for diagonal runs) until the edge crossing is found again. These ellipse fit points are located at the end of the 16 vectors (arrows) is shown in FIG. 6. Not all of the 24 points so defined need be located—the described approach is sufficiently robust that the bulls-eye may be sufficiently well located without finding all 24 points. An ellipse is fitted to the points so generated, using a least-squares fit method to determine the centroid and the major and minor axes directions and dimensions of the ellipse.

Set out below are calculations by which the least squares ellipse fitting may be accomplished:

Gather statistics $$U_{m,n} = \Sigma x_i^m \cdot y_i^n (0 \leq m+n \leq 4)$$

Create matrices $$D = \begin{bmatrix} 1 & 0 & 0 \\ 0 & 2 & 0 \\ 0 & 0 & 1 \end{bmatrix} \quad S_{11} = \begin{bmatrix} u_{4,0} & u_{3,1} & u_{2,2} \\ u_{3,1} & u_{2,2} & u_{1,3} \\ u_{2,2} & u_{1,3} & u_{0,4} \end{bmatrix} \quad S_{12} = \begin{bmatrix} u_{3,0} & u_{2,1} & u_{2,0} \\ u_{2,1} & u_{1,2} & u_{1,1} \\ u_{1,2} & u_{0,3} & u_{0,2} \end{bmatrix}$$

$$S_{22} = \begin{bmatrix} u_{2,0} & u_{1,1} & u_{1,0} \\ u_{1,1} & u_{0,2} & u_{0,1} \\ u_{1,0} & u_{0,1} & u_{0,0} \end{bmatrix}$$

Find eigenvector for the smallest eigenvalue $$(S_{11} - S_{12} \cdot S_{22}^{-1} \cdot S_{12}^T) \cdot V_1 = \lambda \cdot D \cdot V_1$$

Calculate second vector $$V_2 = -S_{22}^{-1} \cdot S_{12}^T \cdot V_1$$

The components of the two vectors are the coefficients for the ellipse equation $$Ax^2 + Bxy + Cy^2 + Dx + Ey + F = 0$$

$$V_1 \begin{pmatrix} A \\ B \\ C \end{pmatrix}_1 \quad V_L = \begin{pmatrix} D \\ E \\ F \end{pmatrix}_2$$

Convert to equivalent ellipse equation form $$\left( \frac{(x-x_0)\cos\phi + (y-y_0)\sin\phi}{r_{maj}} \right)^2 + \left( \frac{(x_1-x_0)\sin\phi - (y-y_0)\cos\phi}{r_{min}} \right)^2 = 1$$

Figure 7:
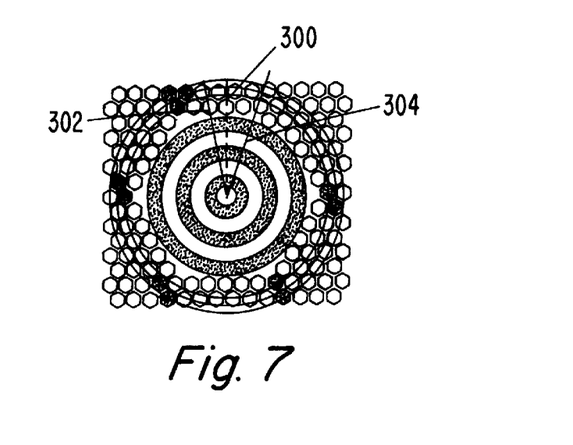
FIG. 7 illustrates aspects of the present invention related to determining the rotation or orientation of a MaxiCode symbol.

Once the major and minor axes of the ellipse are determined, the processing proceeds to find the orientation of the symbol. The ellipse calculated above is expanded outward from the center to the three radii corresponding to estimated radial distances of the center of the 18 orientation hexagons in the symbol. The 18 orientation hexagons are arranged in six groups 214 as shown in FIG. 4. The three radii 300, 302 and 304 are shown in FIG. 7 for the simplest case where the image of the bulls-eye is found to be essentially circular (an ellipse with zero eccentricity). A set of 360 samples is taken along each ellipse (each circle in the case of the image of FIG. 7), one per degree of rotation around the ellipse. Using this set of 3×360 samples, a correlated search is performed for the orientation markers. The rotation(s) at which the maximum number of the orientation hexes is matched is noted. If a continuous set of angles (e.g. from 18–21 degrees) all match the same set of hexes, the center of this range is used to try to locate the center of the orientation hexes if possible. This allows the calculation of the best known position of each of the 18 hexes.

For the four orientation triplets which contain two black and one white hexagon:
  (i) if the postulated positions from the previous step yield the correct sample colors (grey scale values), the hexagon locations are refined by shifting the computed centers to center the internal black-to-white transitions among the hexagons, as well as a black-to-white transition toward the center of the bulls-eye.
  (ii) if the colors do not match, the algorithm looks for a complete match. It uses as potential offsets the following:
    (a) The reverse of the refinement offset applied to the triplet on the opposite side of the bulls-eye.
    (b) The average distance the hexagons were perturbed during step (i).
    (c) All 1-pixel offsets (8 directions).
    (d) All 2-pixel offsets (8 directions).
  (iii) If step (ii) yields a proper color match, the triplet is subjected to the same refinement procedure as in (i).

For the two triplets that are monochromatic (upper right and upper left of FIGS. 4 and 7 several "guesses" as to the correct location are generated using the known bulls-eye center and the positions of the black/white triplets. These are averaged with the current location to obtain a refined location.

Once the rotation of the MaxiCode symbol is determined the hexagonal grid may be mapped. A best-fitted grid technique for doing this will now be described, it being understood that alternative techniques such as a bilinear transformation could be used to map the grid using image data from the bulls-eye.

A best fitted grid technique generally usable in decoding matrix codes will now be described. A linear grid through a Euler transform remains linear, and can be expressed by two co-planes:

$$\begin{cases} x = A_x i + B_x j + C_x \\ y = A_y i + B_y j + C_y \end{cases}$$

Figure 8:
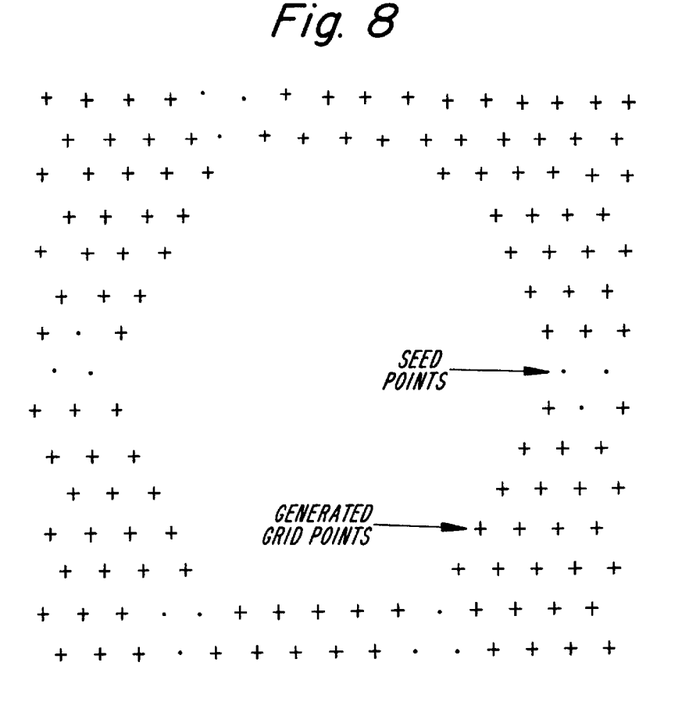
FIG. 8 is an illustration of grid points generated to correspond to a MaxiCode symbol in accordance with a preferred embodiment of the present invention.

Once the coefficients are known, these equations can be used to map a set of indices (i, j) specifying a module in a two dimensional code of interest with the module's coordinate (x, y) in the image or pixel plane. A drawing with a grid generated as such is shown in FIG. 8.

The coefficients $A_x$, $A_y$, $B_x$, $B_y$, $C_x$, $C_y$ themselves can be found through least-square, best-fit method, if we have a few "seed modules" or "seed points" for which we know both (i, j) and (x, y). Such points, corresponding to the orientation hexagons previously determined for an image of a MaxiCode symbol, are shown as dots in FIG. 8. Generated grid points are shown as crosses in FIG. 8. The equations for the least-squared bit fit are:

$$\begin{pmatrix} \sum i^2 & \sum ij & \sum i \\ \sum ij & \sum j^2 & \sum j \\ \sum i & \sum j & N \end{pmatrix} \begin{pmatrix} A_x & A_y \\ B_x & B_y \\ C_x & C_y \end{pmatrix} = \begin{pmatrix} \sum ix & \sum iy \\ \sum jx & \sum jy \\ \sum x & \sum y \end{pmatrix}$$

Here we can also see the reason these two planes are called co-planes: the calculations of their coefficients are closely tied together. In fact, by calculating them at the same time, almost 50% reduction in the amount of calculations can be achieved compared to calculating them separately.

Figure 9:
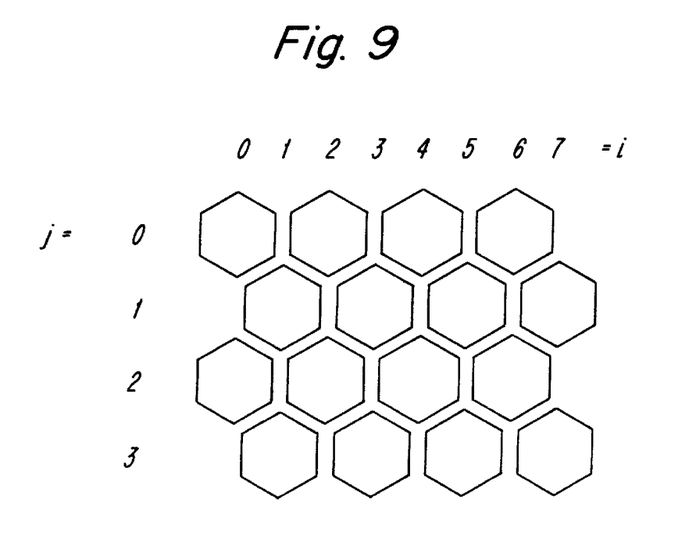
FIG. 9 is an illustration of a hexagonal grid with indexing numbers (i,j)

To apply the described method to MaxiCode, it is necessary to skip some of the index numbers (i, j pairs) so that the modules are indexed linearly in both directions. This is shown graphically in FIG. 9. For example, in FIG. 9 there is no module indexed as (0, 1).

From a comparison of a best-fitted grid technique with a prediction method based on lines, it has been observed that in tilted images the line method starts to fail from very close to the seed points, but the grid method can accurately map the modules locations all the way to the edge of the MaxiCode symbol.

Processing may then proceed to decode the primary message of the MaxiCode. The primary message includes 20 symbol characters designated 1–20 in FIG. 4 and including 120 modules. Symbol characters 1–10 are used to encode data; symbol characters 11–20 are used for error correction. Decoding the primary message may proceed as follows:

(a) Using the positions of the 18 orientation hexes, the position of the hexes in the primary message are calculated. This is largely done by interpolating between the 18 hexes, or extrapolating past them.

(b) The resulting hex locations are sampled to determine their color (grey scale equivalent of black or white). The resulting 1's and 0's are packed into codewords and the Error Correction Code (ECC) procedure applied per the AIM Specification.

(c) If the primary message is decoded properly, further correction and reading can proceed. If not, the next candidate orientation can be tried, if any.

Using the known correct values of each of the hexagons or modules in the primary message, the positions of the centers of the hexagons can be corrected. This is done by finding internal black-to-white transitions in the EEC-corrected data, and then shifting the hex centers in the image to place the transitions found in the image at a position centered between the hex centers. Note that one easy way to do this is to perturb the orientation hexagons, since shifts in their locations will shift the hex centers in proper, correlated fashion.

Using the known primary message hexagon locations, mapping proceeds outwardly from the primary message hexagons into the surrounding hexagons, ring by ring i.e. a radial progression from the center of the symbol. Each hexagon in the surrounding area can be estimated by at least two independent methods using hexagons that are adjacent to it and just past adjacent to it. These two results can be averaged to correct for rounding errors. Once a new set of postulated positions is obtained, it can be refined by "tweaking" the positions to center black-to-white edges. This process, being incremental, will compensate for perspective shifts due to symbol tilt, curvature, and/or distortion. In addition, any time a black-to-white transition is found, the colors (grey scale values) on either side can be examined to produce a local black-white threshold, allowing for changes in illumination across the image.

To further expand the power of best-fitted grid technique described above, one would start from near the seed modules and accumulate the deviations as they are observed while moving away from the seed modules. The deviations can be found from matched filters, a well-known technique in image processing. The matched filters method can work because the module size is know, otherwise we would not have been able to get at least the minimum number (3) of points needed for solving the best-fit equations. Combined with this deviation accumulation method, it is possible to decode codes suffering from non-linear distortion, such as foreshoftening at very close distance.

Figure 10:
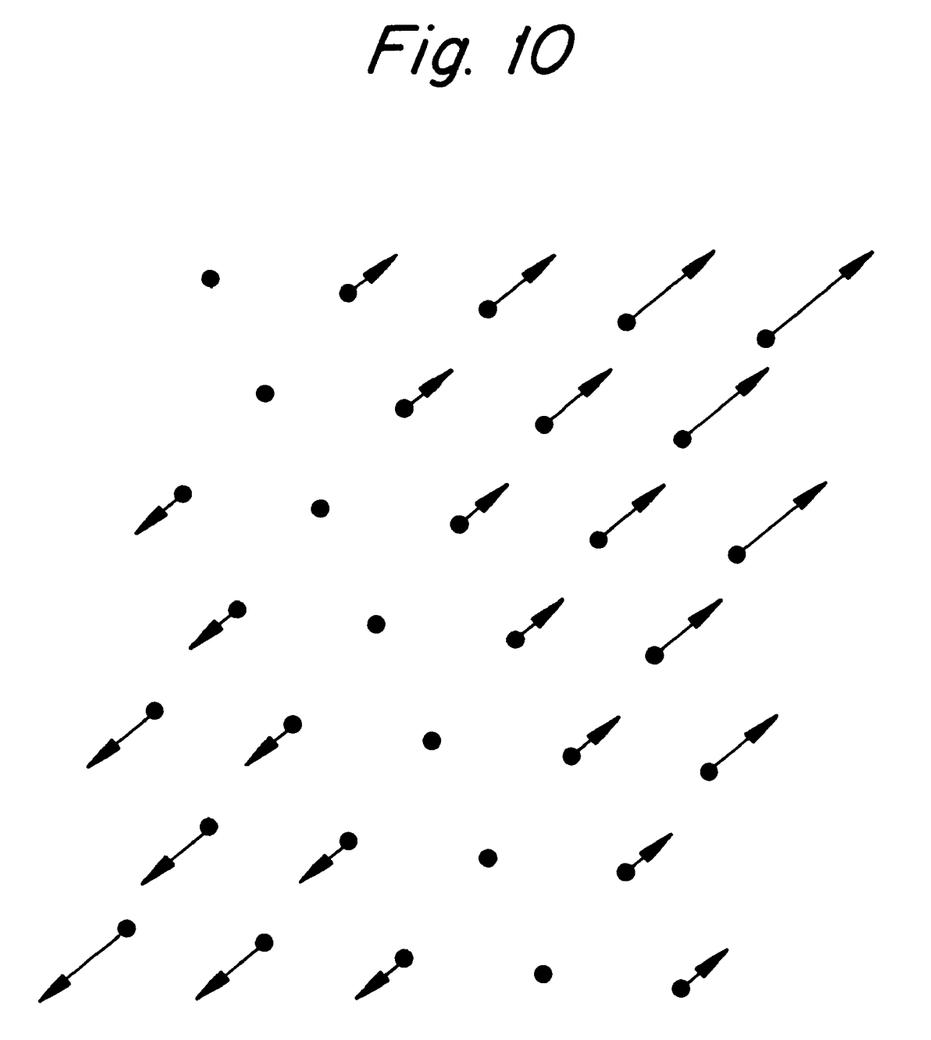
FIG. 10 illustrates a vector field usable in the present invention to correct distortions of image data of a two dimensional code symbol.

Black hexagons, especially if in white neighborhood, can be located more exactly. This property may be exploited to provide a vector field for tweaking the grid. A smooth, unidirectional vector field, which is zero at the bulls-eye is shown in FIG. 10. For example, such a vector field could be used to correct distortions caused by cylindrical warp of the symbol.

Variants of the foregoing technique may be employed. For example, after the orientation hexagons have been located and the grid for the primary message hexagons set up, the orientation hexagon locations could be refined to properly center black-white transitions found in the image before the ECC is run. In contrast, in the procedure discussed above, the ECC is run first. If it succeeds, the system obtains better information about what it should be seeing and computation is reduced in most cases. However, if the ECC fails, refinement to center the black-white transitions could then be attempted and the ECC process tried again. Similarly, additional passes through the secondary message might be desirable if its ECC process fails. Given the nominal outline of the code, as calculated above, and the location of the primary message hexagons, the sampling grid could be warped somewhat and the secondary message hex locations recalculated to try to achieve a successful decode. Again, a possible metric to use would be to have edge locations centered between hex centers.

Once the complete grid has been sampled, the secondary message ECC process is run. The result is indexed presence/absence data for some or all of the MaxiCode grid. This data is translated to deliver the informational content of the symbol.

Thus, through the use of the processing techniques exemplified in FIGS. 2 through 10, translated data may be obtained from signals corresponding to a two dimensional array of pixel information from a field of view containing the image of a MaxiCode symbol. The disclosed techniques are designed to automatically adjust for image size, and tolerate as much as 60° tilt, 360° of rotation and significant warping (hexagon distance change of 50% or more).

The described embodiments of the present invention are intended to be illustrative rather than restrictive, and are not intended to represent every embodiment of the present invention. Various modifications and variations can be made to the disclosed systems without departing from the spirit or scope of the invention as set forth in the following claims both literally and in equivalents recognized in law.

We claim:

1. A method for determining the presence and location of a MaxiCode symbol bulls-eye and the orientation of the symbol in pixel data obtained by an optical code reader comprising the steps of:

identifying a candidate center in a run of pixels having a color indicative of the center area of the bulls-eye;

testing the candidate center to determine if adjacent pixel runs have a predetermined amount of mirror symmetry with respect to the candidate center;

locating plural points located radially outward of the identified run which points correspond to an edge of a ring of the MaxiCode bulls-eye;

fitting an ellipse to said located points;

expanding the ellipse outwardly to estimate the location of orientation modules of the MaxiCode; and determining the orientation of the MaxiCode symbol from information read from the orientation modules.

2. The method of claim 1, wherein the ellipse has major and minor dimensions having a ratio of 2:1 or less.

3. The method of claim 1, wherein a least squares fit is employed to find the major and minor dimensions of the ellipse fitted to the located points.

4. The method of claim 3, wherein the ring edge located is the inner edge of the outermost black ring of the Maxi-Code bulls-eye.

5. The method of claim 3, wherein 8 points on the edge of the ring of the MaxiCode bulls-eyes are located and an additional 16 points are identified on the edge, located at angularly adjacent locations on either side of each of the 8 located points and wherein all 24 points are used in the least square fit to find the major and minor dimensions of the ellipse.

6. A method for associating pixel data in a pixel plane, obtained by an optical code reader from an image of a two dimensional grid-based symbol, with corresponding modules in the grid, comprising the steps of:

identifying subsets of the pixel data having a known association with plural seed modules;

determining the coefficients of an Euler transform through a least-squares best-fit method using the identified association between the pixel data subsets and the seed modules; and using the Euler transform to associate other locations in the pixel plane with additional symbol modules.

7. The method of claim 6, wherein more than six seed modules are employed.

8. The method of claim 7, wherein the symbol is a MaxiCode symbol and the seed modules are the 18 orientation hexagon modules of the MaxiCode symbol.

9. The method of claim 6, wherein the grid-based symbol is located, at least in part, outside of any single plane perpendicular to the optical axis of the optical code reader.

10. A method of decoding a MaxiCode symbol imaged by an optical code reader, the MaxiCode symbol having a central finder pattern and orientation modules, primary data modules and secondary data modules located on a hexagonal grid, comprising the steps of locating the central finder pattern;

locating the orientation modules based on the location of the central finder pattern;

locating primary data modules of the MaxiCode based on the determined location of the orientation modules; and sequentially locating the secondary data modules outwardly from the primary message modules toward the edge of the symbol using previously located positions of adjacent modules.

11. The method of claim 10, wherein the location of secondary data modules are estimated using the positions of adjacent modules and just past adjacent modules.

12. The method of claim 10, further comprising the step of refining the location of a first set of secondary data modules by centering black/white transitions before locating a next set of secondary data modules further outward for the central finder pattern.

13. The method of claim 10, wherein the secondary data modules are located in a successive radial progression of rings of hexagons.

14. The method of claim 10, wherein deviations from a regular hexagonal grid are accumulated as the location of secondary data modules proceeds outwardly from the central finder pattern.

15. A method of determining a candidate location of a MaxiCode symbol bulls-eye center comprising the steps of:

(a) locating a first sequence of plural adjacent pixel runs along a horizontal axis, the runs in the sequence having alternating colors;

(b) determining whether the lengths of the located horizontal pixel runs have a predetermined proportionate relationship;

(c) locating a second sequence of plural, adjacent pixel runs having alternating colors along a second axis running through the center of the central horizontal run and not parallel with the horizontal axis;

(d) determining whether the lengths of the pixel runs of the second sequence have a predetermined proportionate relationship with respect to a central run; and (e) identifying a candidate location of a MaxiCode symbol bulls-eye center based on a positive determination in step (d).

16. The method of claim 15, wherein the first sequence is selected so that it has nine runs, the runs in the sequence being alternating black and white runs, first of which is white.

17. The method of claim 15, further comprising the step of using the candidate location determined in step (e) to define new axes along which new sequences of pixel runs are evaluated to determine whether the runs have a predetermined proportionate relationship.

18. The method of claim 17, further comprising the step of determining whether the lengths of sequences of runs which run in different directions have a predetermined proportionate relationship.

19. The method of claim 15, wherein the predetermined proportionate relationship with respect to the central run is one in which pixel runs on both sides of the central run have lengths between one-half and twice the length of the central run.

* * * * *